H. JUNGJOHANN.
PRESSURE RECORDING VALVE.
APPLICATION FILED MAR. 25, 1915.

1,208,162.

Patented Dec. 12, 1916.

Witness
A. Burmann

Inventor
H. Jungjohann
Per A. B. Frevier
Attorney

UNITED STATES PATENT OFFICE.

HENRY JUNGJOHANN, OF DAVENPORT, IOWA.

PRESSURE-RECORDING VALVE.

1,208,162.  Specification of Letters Patent.  Patented Dec. 12, 1916.

Application filed March 25, 1915.  Serial No. 16,905.

*To all whom it may concern:*

Be it known that I, HENRY JUNGJOHANN, a citizen of the United States of America, and resident of Davenport, Scott county, Iowa, have invented a certain new and useful Improvement in Pressure-Recording Valves, of which the following is a specification.

My invention relates to a valve mechanism and pressure recording device especially adapted for use in inflating pneumatic tires of automobiles and the like, and has for its object to provide a quick acting manually operated valve equipped with a pressure gage, which will form a connection from the end of an air-hose to the valve tube of a pneumatic tire, by simply pressing the same down over the tube, without the necessity of manipulating screw threaded connections.

Another object is to provide a device that is simple, neat in appearance, durable and readily accessible in all its parts.

With these objects in view, my invention consists in certain novel features of construction hereinafter described and shown in the accompanying drawing, in which—

Figure 1:
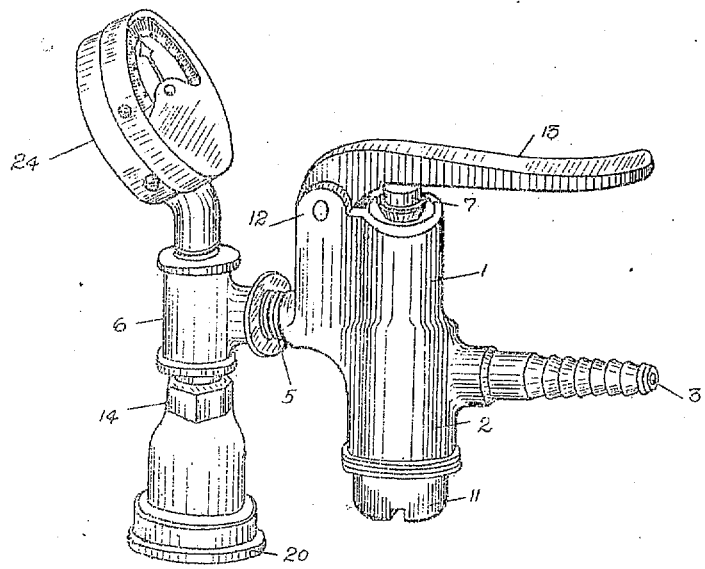
Figure 2:
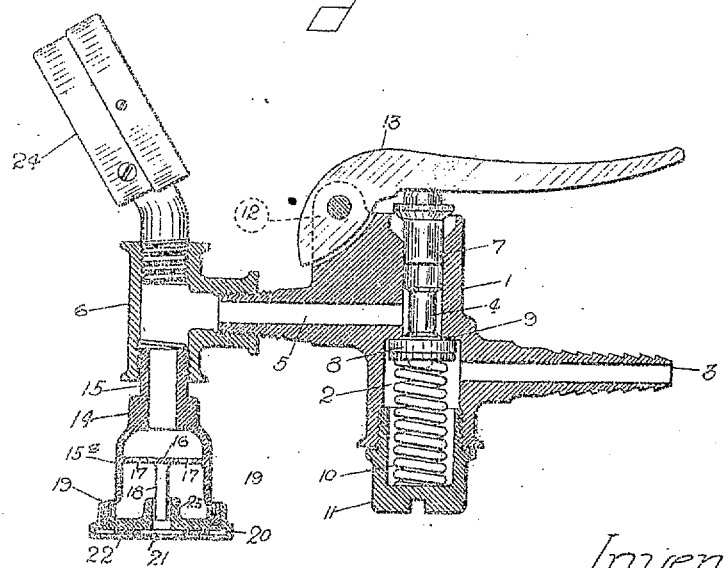

Figure 1 is a perspective view of my improved device, and Fig. 2 is a vertical cross section thereof.

In the drawing, in which similar reference characters refer to similar parts throughout, I have illustrated the preferred form of my invention and show same as comprising a valve 1, having a chamber 2, provided with an inlet 3 consisting of a tubular stem having peripheral ribs and of a size and shape as to be received within one end of a flexible tube or hose (not shown) with the other end attached to a compressed air line or reservoir. Communicating with the chamber 2 is the smaller chamber 4 which is provided with the outlet 5, the outer surface of which, at its free end, is screw threaded to receive the T fitting 6. Slidably mounted in the chamber 4 is the valve 7 which is provided with the disk or head 8 adapted to bear against the seat 9. While the disk 8 would normally be held forcibly against the seat 9 by the air pressure in the chamber 2, I provide the light spring 10 which contacts the under side of the disk 8 and is held in such position by the cap 11 which is screw threaded into the lower part of the chamber 2. The spring will thus prevent displacement of the valve upon the shutting off of the air pressure. Pivotally connected to the lug 12, which is made integral with the upper portion of the valve 1 is the hand lever 13 which contacts the upper exposed end of the valve stem 7 and is adapted to force the disk 8 off its seat, admitting air to pass from the chamber 2 through outlet 5.

Screw threaded into the lower end of the fitting 6 is the slip-connection 14, which may consist of the screw threaded shank 15 and the bell-shaped chamber portion 15ᵃ. On the interior of this chamber and in the upper portion thereof, is the diaphragm or partition 16, which is provided with the openings or apertures 17 and the pin 18 pendant from the under side thereof and terminating in the plane of the lower edge of the chamber. To the lower edge of the chamber, which is off-set or enlarged, forming the shoulder 19, is screw threaded the cap 20 provided with the central opening 21. Confined between this cap and the shoulder 19 is the soft rubber ring packing 22, which is provided at its center with the raised tubular member 23 having an opening of larger diameter than the pin 18 which it surrounds. The opening 21 in the cap 20 is adapted to pass over the tire valve tube (not shown) with the tube passing through the rubber packing ring. As the opening in the ring is of slightly less diameter than the outside diameter of the tube, it will be drawn tightly over the tube, forming an air tight joint with the outer surface of the tube to prevent waste of air during the charging of the tire and, as the raised tubular member 23 of the flexible packing ring closely surrounds the pin 18 which depends to a point in the plane of the lower edge of the chamber, this raised portion will be pressed against the pin to form an air-tight closure to prevent waste of air if the lever 13 is accidentally or through carelessness held down when the device is disconnected from the tire-valve tube, and this construction also enables air-pressure to be admitted to the gage when the device is disconnected from the tire-valve tube to test the pressure in the storage reservoir from the end of the air line. When the tube passes through the ring and contacts the pin 18 enters the tube and contacts the tire valve stem (not shown) forcing it off its seat, permitting the air to rush into the tire upon depressing the lever 13. The pressure gage 24 is screw threaded into the upper opening of the fitting 6. On releasing the lever 13, shutting off the air from the source of supply, the pressure of air in the tire is at once registered on the gage the tire valve being held open by pin 18. If an insufficient pressure shows, more can be immediately secured by again depressing lever 13.

The supplying of air to the patrons of a garage for inflating tires is an item of considerable expense and is usually a service for which no charge is made. This expense is unwarrantedly increased by the wasteful consumption of air.

Ordinarily a hose of sufficient length to extend from the shut-off valve in the air-line to the four wheels of an automobile is employed, and as this takes the user some little distance from the shut-off valve, it is found more convenient to permit the air to wastefully "blow" while changing from one wheel to another than to walk, each time, to the shut-off, or an effort is made to confine the air by "kinking" the hose, a practice resulting in its early destruction. By the use of my device a great saving in the consumption of air is effected, and the frequent renewal of the hose is avoided.

The device not only indicates the pressure in the inflated tire, guarding against bursting from over-inflation, but as the air pressure in the chamber 15ª compresses the packing ring 22 firmly against the pin 18, when the device is not in connection with the valve tube of a tire, the pressure on the air line or in the reservoir can be immediately determined by simply depressing the lever 13, making unnecessary a trip to the compressor, which is usually located at some distant point in the garage.

One of its greatest advantages lies in the fact that the entire device is relatively small, and capable of being held in and manipulated by one hand to perform its several functions. Positions ordinarily difficult to reach are thus rendered comfortably and conveniently accessible. By grasping the valve, with the lever handle lying in the palm, the automatically formed air-tight slip connection is readily forced over the end of the tire-valve tube and, without releasing the hold or changing the position of the hand, the valve is operated by simply contracting and relaxing the grip and it will be observed that the necessary pressure to open the valve is applied in the direction of thrust in making the automatic slip connection.

Having thus clearly described my invention, what I claim as new is:

1. In a device of the class set forth, a T-fitting; a pressure gage attached to one of the passages thereof; a tire-nipple engaging device connected to the passage of the fitting opposite the pressure gage and provided with a valve device adapted to make an air-tight connection with the nipple body and also adapted to close by internal air pressure when the device is disconnected from the nipple; a valve casing attached to the remaining passage of said fitting and provided with means for connecting it with an air-hose; and a manually-operated reciprocating valve mounted in said casing between the fitting connection and the air-hose connection, said valve being reciprocable on a line parallel with the tire-nipple engaging device and adapted to open in the direction of thrust in making connection with a tire valve.

2. In a valve of the class described, a three-way fitting; an attachment secured to said fitting affording communication to a source of air supply; a connecting member and a recording gage secured to said fitting; in combination with means adapted to establish communication from said source of air supply to said connecting member and to said recording gage, said connecting member being provided with automatic means whereby communication may be established between the source of air supply and said recording gage without the escape of air from the connecting member.

3. In a valve of the class described, a valve body provided with an inlet and an outlet; means adapted to establish communication from a source of air supply to said inlet; and an automatic slip connection communicating with said outlet comprising a body portion having a vertically extending tire-valve-opening pin affixed centrally thereof and a packing ring having a raised central portion surrounding said pin capable of being expanded from said pin forming an air passage to and an air-tight connection with a tire valve and of being compressed against said pin forming an air-tight closure when disconnected from a tire valve.

Signed by me at Davenport, Iowa, this 22nd day of March, 1915.

HENRY JUNGJOHANN.

Witnesses:
 KATHRYN MAHAN,
 CARRIE L. VAN TUYL.